(12) United States Patent
Guo et al.

(10) Patent No.: US 11,539,878 B2
(45) Date of Patent: Dec. 27, 2022

(54) METHOD AND APPARATUS FOR CONTROLLING VIDEO RECORDING

(71) Applicant: Beijing SuperHexa Century Technology CO. Ltd., Beijing (CN)

(72) Inventors: Jun Guo, Beijing (CN); Pengfei Zhang, Beijing (CN)

(73) Assignee: BEIJING SUPERHEXA CENTURY TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/511,468

(22) Filed: Oct. 26, 2021

(65) Prior Publication Data
US 2022/0256074 A1 Aug. 11, 2022

(30) Foreign Application Priority Data
Feb. 7, 2021 (CN) .......................... 202110169516.9

(51) Int. Cl.
*H04N 5/232* (2006.01)
*H04N 5/77* (2006.01)
(Continued)

(52) U.S. Cl.
CPC ..... *H04N 5/23216* (2013.01); *H04N 5/23296* (2013.01); *H04N 5/772* (2013.01)

(58) Field of Classification Search
None
See application file for complete search history.

(56) References Cited

U.S. PATENT DOCUMENTS

| 9,658,452 B2* | 5/2017 | Lim | G06F 3/0482 |
| 2014/0055633 A1* | 2/2014 | Marlin | H04N 5/772 |
| | | | 348/E5.031 |

(Continued)

FOREIGN PATENT DOCUMENTS

| CN | 102801942 A | 11/2012 |
| CN | 104486543 A | 4/2015 |

(Continued)

OTHER PUBLICATIONS

Search Report of the parallel EP application No. 21205764.0.
(Continued)

*Primary Examiner* — Hung Q Dang
(74) *Attorney, Agent, or Firm* — J.C. Patents

(57) ABSTRACT

The present disclosure provides a method and an apparatus for controlling video recording. The method is applied to a head-wearable device provided with a camera and a touch-control area, including: starting video recording in response to a multi-touch operation on the touch-control area; adjusting, in a process of the video recording, a zoom ratio for the video recording according to a moving track of a touch point corresponding to the multi-touch operation; terminating the video recording when it is determined that a recording termination condition is met, where the recording termination condition includes that the multi-touch operation disappears and a duration of the disappearing reaches a first preset duration. In the technical solution of the present disclosure, a series of operation of quickly starting video recording, zooming during recording, and terminating video recording can be completed through simple multi-touch operations, improving the efficiency of interactive operations and the user experience.

12 Claims, 6 Drawing Sheets

(51) Int. Cl.
  *G06F 1/16* (2006.01)
  *G06F 3/01* (2006.01)
  *G06F 3/0354* (2013.01)
  *G06F 3/04883* (2022.01)

(56) References Cited

U.S. PATENT DOCUMENTS

| | | | |
|---|---|---|---|
| 2015/0138064 A1* | 5/2015 | Li | G02B 27/017 |
| | | | 345/156 |
| 2016/0011420 A1 | 1/2016 | Jang | |
| 2016/0147309 A1 | 5/2016 | Li | |

FOREIGN PATENT DOCUMENTS

| CN | 104967770 A | 10/2015 |
|---|---|---|
| CN | 105704539 A | 6/2016 |
| CN | 105791670 A | 7/2016 |
| CN | 105847663 A | 8/2016 |
| CN | 105991930 A | 10/2016 |
| CN | 106303258 A | 1/2017 |
| CN | 106506801 A | 3/2017 |
| CN | 106657774 A | 5/2017 |
| CN | 108111750 A | 6/2018 |
| CN | 108810403 A | 11/2018 |
| CN | 109656636 A | 4/2019 |
| CN | 110336967 A | 10/2019 |
| CN | 111970456 A | 11/2020 |
| JP | 2013250986 A | 12/2013 |
| KR | 1020160005416 A | 1/2016 |
| WO | WO2017107324 A1 | 6/2017 |

OTHER PUBLICATIONS

First Search Report of the priority CN application.
First Office Action of the priority CN application.
Notice of Allowance of the priority CN application.
Second Search Report of the priority CN application.

* cited by examiner

METHOD AND APPARATUS FOR CONTROLLING VIDEO RECORDING

CROSS-REFERENCE TO RELATED APPLICATIONS

This application claims priority to Chinese Patent Application No. 202110169516.9, filed on Feb. 7, 2021, which is hereby incorporated by reference in its entirety.

TECHNICAL FIELD

The present disclosure relates to the field of controlling technologies, in particular, to a method and an apparatus for controlling video recording.

BACKGROUND

In order to facilitate users' lives, various intelligent electronic devices come into being. In recent years, more and more users choose to use intelligent head-wearable devices. In related technologies, the intelligent head-wearable devices can perform operations such as photographing, camera shooting, navigating, etc. How to simplify user operations in the process of interaction between users and intelligent head-wearable devices has become an urgent problem to be solved.

SUMMARY

In consideration of this, the present disclosure provides a method and an apparatus for controlling video recording.

Specifically, the present disclosure is implemented through the following technical solution.

According to a first aspect of the present disclosure, there is provided a method for controlling video recording, which is applied to a head-wearable device, where the head-wearable device is provided with a camera and a touch-control area, and the method includes:

starting video recording in response to a multi-touch operation on the touch-control area;

adjusting, in a process of the video recording, a zoom ratio for the video recording according to a moving track of a touch point corresponding to the multi-touch operation; and terminating the video recording when it is determined that a recording termination condition is met, where the recording termination condition includes that the multi-touch operation disappears and a duration of the disappearing reaches a first preset duration.

According to a second aspect of the present disclosure, there is provided an apparatus for controlling video recording, which is applied to a head-wearable device, where the head-wearable device is provided with a camera and a touch-control area, and the apparatus includes:

a touch-controlling unit, configured to start video recording in response to a multi-touch operation on the touch-control area;

a zooming unit, configured to adjust, in a process of the video recording, a zoom ratio for the video recording according to a moving track of a touch point corresponding to the multi-touch operation; and a terminating unit, configured to terminate the video recording when it is determined that a recording termination condition is met, where the recording termination condition includes that the multi-touch operation disappears and a duration of the disappearing reaches a first preset duration.

According to a third aspect of the present disclosure, there is provided an electronic device, including:

a processor; and a memory for storing processor-executable instructions;

where the processor executes the processor-executable instructions to implement the method according to embodiments of the above first aspect.

According to a fourth aspect of embodiments of the present disclosure, there is provided a computer-readable storage medium having stored thereon computer instructions that, when executed by a processor, implement the steps of the method according to the embodiments of the above first aspect.

As can be seen from the above technical solution provided by the present disclosure, in the present disclosure, the video recording is directly started by starting a video recording function of the head-wearable device through the multi-touch operation, so that the user can complete a series of processes such as starting the camera, selecting a video recording mode, starting the video recording, etc. by one touch operation, which simplifies the user's operation and improves the user's operation efficiency. In addition, a quick start of video recording through the above multi-touch operation can help the user to capture short-duration video images in time, preventing the user from missing an image content required to be taken, and improving user experience. Meanwhile, according to the present disclosure, in the process of the video recording, the zoom ratio for the video recording is adjustable according to the moving track of the touch point corresponding to the multi-touch operation, which can help the user to adjust the distance perceived in an image during video recording in real time and meets the user's need to record images at different distances from the camera; secondly, the video recording terminates when the multi-touch operation disappears, which eliminates an operation step that the user needs to further click a button for terminating the videoing function, and thus further simplify the user's operation, thereby improving the interaction efficiency between the user and the head-wearable device; and finally, in the technical solution of the present disclosure, the user is enabled to control multiple functions involved in the video recording process through continuous interactive operations which run through the whole video recording process, and the user can control, efficiently and quickly, the video recording process through the above simple interactive operations.

BRIEF DESCRIPTION OF THE DRAWINGS

The accompanying drawings are incorporated in this specification and constitute a part of the specification, illustrate embodiments consistent with the present disclosure and serve, together with the specification, to describe the principle of the present disclosure.

DESCRIPTION OF EMBODIMENTS

Illustrative embodiments will be described in detail herein, and examples thereof are shown in the accompanying drawings. When the following description refers to the accompanying drawings, unless otherwise indicated, same numbers in different drawings refer to the same or similar elements. The implementations described in the following illustrative embodiments do not represent all implementations consistent with the present disclosure. Rather, they are merely examples of apparatuses and methods consistent with some aspects of the present disclosure as detailed in the appended claims.

Terms used in the present disclosure are for the purpose of describing specific embodiments only, and are not intended to limit the present disclosure. As used in the present disclosure and the appended claims, the singular forms "a", "said" and "the" are also intended to include the plural forms, unless the context clearly indicates other meaning. It should also be understood that the term "and/or" as used herein refers to and includes any or all possible combinations of one or more associated listed items.

It should be understood that although terms "first", "second", "third", etc. may be used in the present disclosure to describe various kinds of information, and the information should not be limited thereto. These terms are only used to distinguish the same type of information from each other. For example, without departing from the scope of the present disclosure, first information can also be called second information, and similarly, second information can also be called first information. Depending on the context, the word "if" as used herein can be interpreted as "when" or "while" or "in response to a determination".

The embodiments of the present disclosure will be described in detail below.

Figure 1:
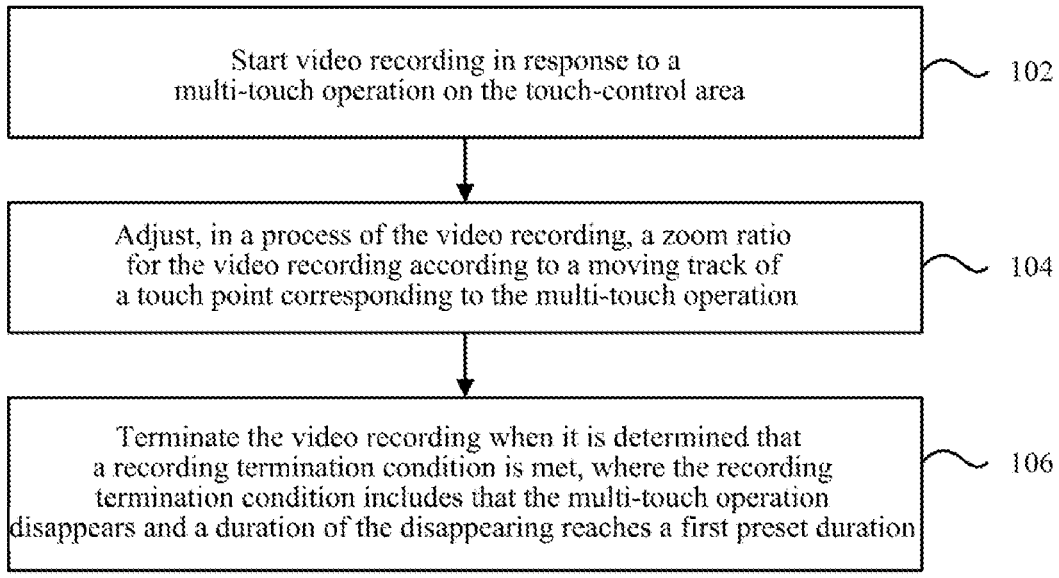
FIG. 1 is a flowchart showing a method for controlling video recording according to an illustrative embodiment of the present disclosure.

FIG. 1 is a flowchart showing a method for controlling video recording according to an illustrative embodiment of the present disclosure. The method is applied to a head-wearable device which is provided with a camera and a touch-control area and can be represented in a form of glasses, helmets, hats and the like, and the specific form of the head-wearable device is not limited in the present disclosure. With reference to FIG. 1, the above method may include following steps.

Step 102: start video recording in response to a multi-touch operation on the touch-control area.

In an embodiment, the head-wearable device can start video recording in response to a user's multi-touch operation on the touch-control area. A point where the user touches the touch-control area is called a touch point, and the multi-touch operation indicates that an amount of touch points where the user touches the touch-control area is not less than two. In actual use, the user generally touches the touch-control area with a finger, and one touch point is formed where each finger touches the touch-control area. The user can complete the multi-touch operation with no less than two fingers. For example, the user can complete the multi-touch operation by means of a two-finger touch, a three-finger touch, etc. The amount of touch points in a multi-touch operation is not limited otherwise in the present disclosure. For example, when the user touches the touch-control area of the head-wearable device with two fingers, the head-wearable device can start video recording in response to the user's two-finger touch operation. The starting video recording described above is different from starting a functional interface for video recording without starting video recording. In other words, the starting video recording described above refers to entering the functional interface of video recording and starting collecting video images directly.

In an embodiment, the starting video recording may include: starting the video recording with a zoom ratio used at a moment when the previous video recording terminates. For example, when the user starts the touch operation through the multi-touch operation, and starts video recording again through the multi-touch operation after a video recording is finished, a zoom ratio used in current video recording can continue to use a zoom ratio used at a moment when the previous video recording is finished. That is, the current zoom ratio is retained when a video recording terminates, and is continued to be used for a next video recording. Due to different recording contents and different recording habits of the user, when the user needs to record videos in segments, continuously, the zoom ratio is retained when the previous video recording terminates, so as to be continued to be used in the next video recording, thus avoiding a tedious operation of adjusting a zoom ratio again when the user records videos in segments, continuously.

In an embodiment, the starting video recording may include: starting the video recording with a preset zoom ratio. For example, when the user starts a touch operation through a multi-touch operation and the video recording is finished, the zoom ratio of the camera can be adjusted to a preset value which is flexibly adjustable as required. When the user needs to record a far or near scene, the zoom ratio will be adjusted to an unusual ratio for the recording quality, and the zoom ratio of the camera can be restored to the preset value when the video recording is finished, since the user in most cases only needs to use a relatively moderate ratio for recording. The preset value can be a zoom ratio value commonly used by the user when recording videos, so as to meet recording requirements of the user in most cases. In addition, the above preset value can be set by the user according to his or her own recording habits, or statistics of zoom ratios used by the user in multiple video recordings can be made to select an average value of multiple zoom ratio values or select a most frequently occurring ratio value among the multiple zoom ratio values as the preset value. In this way, the user's requirements for the zoom ratio value used for video recording in normal cases can be met, and the user is prevented from adjusting the zoom ratio again when starting video recording.

Step 104: adjust, in a process of the video recording, a zoom ratio for the video recording according to a moving track of a touch point corresponding to the multi-touch operation.

In an embodiment, the user can adjust the zoom ratio by moving the touch point during the video recording. For example, when the user's hand touches a touch-control area on the head-wearable device, the user's hand, in the process of the video recording, can slide in the touch-control area under the condition of continuously touching the touch-control area, and the head-wearable device adjusts the zoom ratio of the current video recording according to the sliding track of the user's hand in the touch-control area.

In an embodiment, when the head-wearable device detects that all touch points move towards a first direction, the zoom ratio is increased; when the head-wearable device detects that all touch points move towards a second direction, the zoom ratio is reduced. For example, it is assumed that a direction towards the camera is the first direction and a direction away from the camera is the second direction, since each finger's touch on the touch-control area forms one touch point, when all touch points move towards the camera, in other words, when the user slides in the first direction while keeping touching the touch-control area, a sliding track towards the first direction is formed in the touch-control area. At this point, the zoom ratio can be increased, and that is, zoom in of a recorded scene is enabled. When all touch points move away from the camera, in other words, when the user slides in the second direction while keeping touching the touch-control area, a sliding track towards the second direction is formed in the touch-control area. At this point, the zoom ratio can be reduced, and that is, zoom out of a recorded scene is enabled, thereby expanding a recording range. A variation factor of the zoom ratio is positively correlated with a distance moved by all the touch points. That is, the longer a length of a sliding track formed by the user in the touch-control area in the direction towards the camera is, the greater a magnification factor of the zoom ratio is; and on the contrary, the longer a length of a sliding track formed by the user in the touch-control area in the direction away from the camera is, the greater a reduction factor of the zoom ratio is.

In an embodiment, when the head-wearable device detects that a first change occurs to a relative distance between a part of touch points and other touch points in all touch points, the zoom ratio is increased; and when the head-wearable device detects that a second change occurs to the relative distance between a part of touch points and other touch points in all touch points, the zoom ratio is reduced. For example, since each finger's touch on the touch-control area forms one touch point, it is assumed that the user touches the touch-control area with two fingers, when the two fingers of the user slide in a mode of being apart gradually in the touch-control area, two sliding tracks will be formed in the touch-control area, orientations of the two sliding tracks are opposite and the distance between the two touch points gradually increases. At this point, the zoom ratio for the current video recording is increased. On the contrary, when the two fingers of the user slide in a mode of coming together gradually, two sliding tracks will also be formed in the touch-control area, but orientations of the two sliding tracks are face-to-face and the distance between the two touch points decreases. At this point, the zoom ratio for the current video recording is reduced. The variation factor of the zoom ratio is positively correlated with an amount of change in the relative distance. That is, the greater the change in distance between touch points is, the greater the variation factor of the zoom ratio is; and the smaller the change in distance between touch points is, the smaller the variation factor of the zoom ratio is.

Step 106: terminate the video recording when it is determined that a recording termination condition is met, where the recording termination condition includes that the multi-touch operation disappears and a duration of the disappearing reaches a first preset duration.

In an embodiment, it can be understood that when the user touches the touch-control area with a finger, one touch point is formed where each finger touches the touch-control area. When the finger of the user departs from the touch-control area, the touch point disappears; and when all touch points disappear, it indicates that the user's multi-touch operation on the touch-control area disappears. When the multi-touch operation disappears and the duration of the disappearing reaches the first preset duration, the video recording can be terminated and a generated video file can be saved. It is worth noting that when the multi-touch operation disappears, but the duration of the disappearing does not reach the first preset duration yet, the video recording can be paused or continued; and if the video recording is continued, the video recording ends when the first preset duration is reached. The first preset duration is flexibly adjustable according to actual conditions and values from engineering experience, which is not limited in the present disclosure.

In an embodiment, the method may further include: invalidating the recording termination condition when it is determined that an invalidation condition corresponding to the recording termination condition is met, where the invalidation condition includes: a duration of the multi-touch operation is no less than a second preset duration. When the recording termination condition is invalid, the video recording is continued when the multi-touch operation disappears and the duration of the disappearing reaches the first preset duration. For example, it is assumed that the first preset duration is 1 second and the second preset duration is 5 seconds, when the duration of the multi-touch operation performed by the user on the touch-control area reaches 5 seconds, the user stops the multi-touch operation on the touch-control area, and when the duration of ending the multi-touch operation reaches 1 second, the video recording is continued instead of being stopped. Of course, the relationship between sizes of the first preset duration and the second preset duration is not limited in present disclosure, and the first preset duration can also be greater than the second preset duration without affecting the implementation of the solution. In other words, when the user's multi-touch operation reaches the second preset duration, the user does not need to continue the multi-touch operation. At this point, the user can continue to record video without touching the touch-control area of the head-wearable device, which reduces the limitation of touch operation on the user's actions.

In an embodiment, in the process of video recording, video recording is paused when the multi-touch operation disappears, and video recording is continued when the multi-touch operation recovers within a third preset duration. It is assumed that the third preset duration is 0.5 seconds, when the multi-touch operation of the user on the touch-control area ends and is recovered within 0.5 seconds afterwards, video recording may be continued instead of being terminated, and during the 0.5 seconds, video recording is paused when the multi-touch operation ends, and is continued when the multi-touch operation is recovered. Alternatively, when an interval from disappearance to recovery of the multi-touch operation is less than 0.5 seconds, video recording is maintained both in the process of the disappearance and after the recovery of the multi-touch operation. Alternatively, in the process of video recording, video recording is continued after the multi-touch operation disappears, and is paused if the multi-touch operation is not recovered within the 0.5 seconds. It is worth noting that the third preset duration can be any value less than or equal to the first preset duration, which is not limited in present disclosure. In this embodiment, when the user stops touching the touch-control area and quickly recovers the touching operation, video recording will not be terminated, thus avoiding termination of video recording due to the case that the user stops touching the touch-control area for a short time under special circumstances.

In an embodiment, the method may further include: in the process of the video recording, when a part of touch points disappears and then recovers within a fourth preset duration, performing a photographing operation and maintaining the video recording. For example, it is assumed that the fourth preset duration is 0.5 seconds, when the user uses a two-finger touch operation, the user lifts one finger in the process of video recording, to have one touch point disappear, and the two-finger touch operation is recovered within 0.5 seconds. At this point, a photo capture operation can be performed while maintaining the video recording, and an amount of photos captured (one photo or multiple photos can be captured) and a form of the photo capture (a photo can be captured in a dynamic form or in a static form) are not limited in present disclosure.

It can be seen from the above technical solution provided by the present disclosure that in the present disclosure, the video recording is directly started by starting a video recording function of the head-wearable device through the multi-touch operation, so that the user can complete a series of processes such as starting the camera, selecting a video recording mode, starting the video recording, etc. by one touch operation, which simplifies the user's operation and improves the user's operation efficiency. In addition, a quick start of video recording through the above multi-touch operation can help the user to capture short-duration video images in time, preventing the user from missing an image content required to be taken, and improving user experience. Meanwhile, according to the present disclosure, in the process of the video recording, the zoom ratio for the video recording is adjustable according to the moving track of the touch point corresponding to the multi-touch operation, which can help the user to adjust the distance perceived in an image during video recording in real time through a simple sliding operation and meets the user's need to record images at different distances from the camera; in addition, the video recording terminates when the multi-touch operation disappears, which eliminates an operation step that the user needs to further click a button for terminating the videoing function, and thus further simplify the user's operation, thereby improving the interaction efficiency between the user and the head-wearable device.

Overall, in the technical solution of the present disclosure, the user is enabled to control a plurality of functions involved in the video recording process through continuous interactive operations which run through the whole video recording process, and the user may efficiently and quickly control the video recording process through the simple interactive operations.

Figure 2:
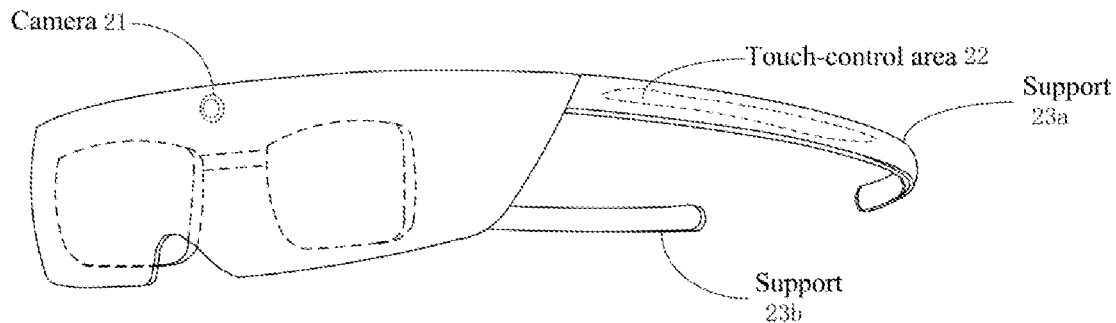
FIG. 2 is a schematic diagram showing a head-wearable device according to an illustrative embodiment of the present disclosure.
Figure 3:
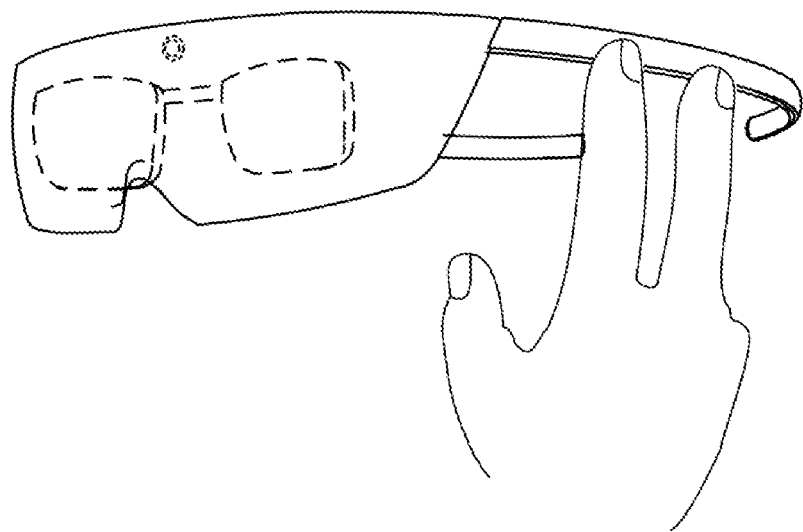
FIG. 3 is a schematic diagram showing an operation of a head-wearable device according to an illustrative embodiment of the present disclosure.
Figure 4:
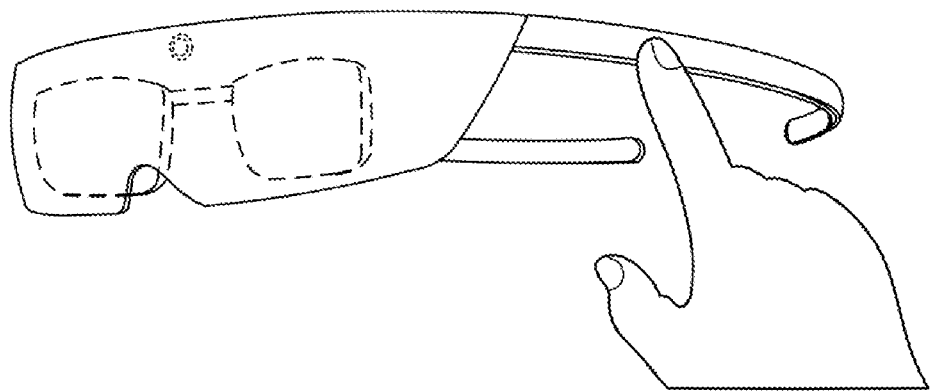
FIG. 4 is a schematic diagram showing a second operation of a head-wearable device according to an illustrative embodiment of the present disclosure.

Finally, in the present disclosure, an expansion of a video recording function in different dimensions is realized by setting different preset durations, so that the user can not only capture photos during the video recording, but also continue the video recording without a touch operation after the touch operation lasts a certain amount of time. The various technical solutions provided by the present disclosure can better adapt to various possible actual situations when the user actually uses the head-wearable device, thereby improving the user experience. As shown in FIG. 2, the following embodiments are described in detail by taking the head-wearable device embodied as intelligent glasses as an example. The intelligent glasses shown in FIG. 2 can be worn on the head by a user, and at least include a camera 21 and a touch-control area 22. The touch-control area 22 can be located on an outer surface of a head-wearable device support 23, and the intelligent glasses can have one or more touch-control areas. The present disclosure does not limit the location and amount of touch-control areas. Specifically, FIG. 2 shows a state where the user does not perform a touch operation, such operation state can be called state 1, and no touch point is formed at this time. FIG. 3 shows a state where the user touches the touch-control area on the intelligent glasses with two fingers, and such operation state can be called state 2. In state 2, the user touches the touch-control area with two fingers to form two touch points respectively. FIG. 4 shows a state where the user touches the touch-control area with a single finger, and such operation state can be called state 3. Compared with state 2, because the user touches the touch-control area with only a single finger, one touch point disappears, and that is, only one touch point exists in state 3.

Several different implementations will be described in detail with reference to FIG. 2 to FIG. 4.

Figure 5:
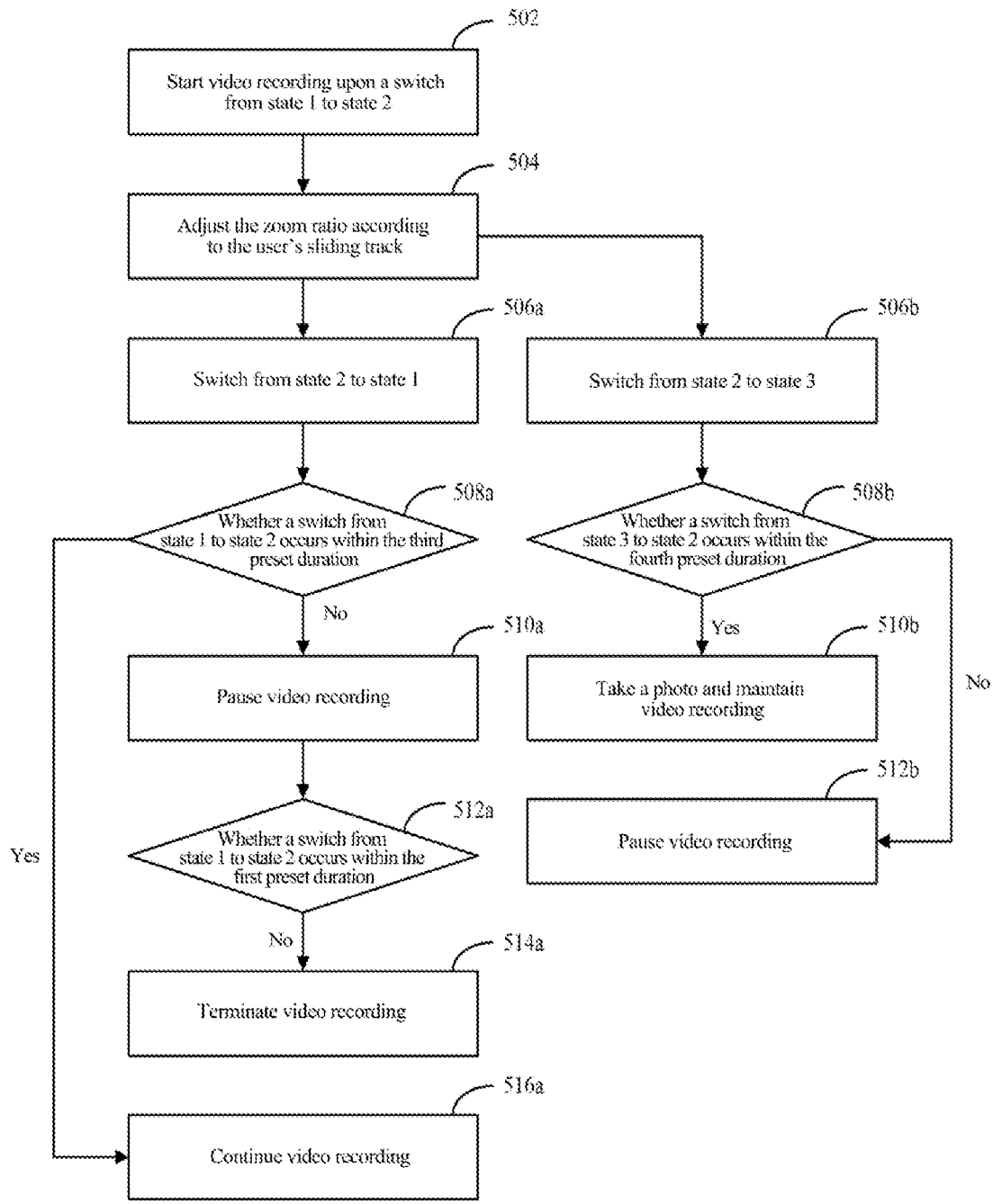
FIG. 5 is a specific flowchart showing a method for controlling video recording according to an illustrative embodiment of the present disclosure.

FIG. 5 is a flowchart of a method for controlling video recording according to an illustrative embodiment of the present disclosure, and the above method may include the following steps.

Step 502: start video recording when the intelligent glasses switch from state 1 to state 2. In this step, the user touches the touch-control area on a support of the intelligent glasses with two fingers, the intelligent glasses switch from state 1 to state 2, and then the intelligent glasses directly start the video recording in response to the two-finger touch operation.

Step 504: adjust the zoom ratio according to the user's sliding track.

Figure 6:
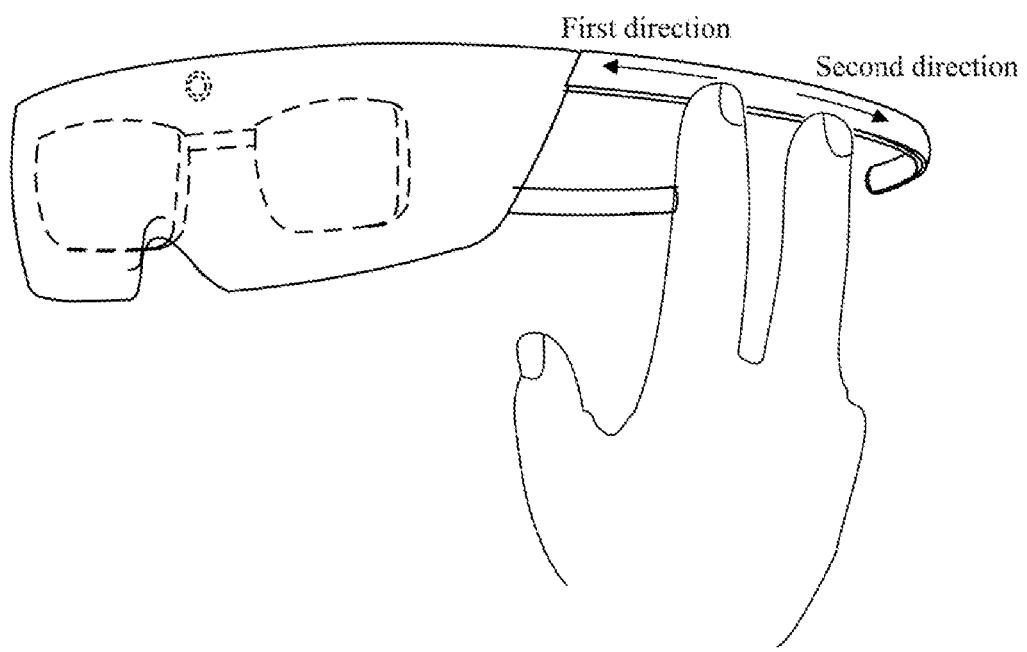
FIG. 6 is a schematic diagram showing a third operation of a head-wearable device according to an illustrative embodiment of the present disclosure.

In an embodiment, as shown in FIG. 6, a direction towards the camera of the intelligent glasses is a first direction, and a direction away from the camera of the intelligent glasses is a second direction. If the user's two fingers slide in the first direction while keeping touching the touch-control area, the zoom ratio is increased, and that is, a scene that is recorded is zoomed in; if the user's two fingers slide in the second direction while keeping touching the touch-control area, the zoom ratio is reduced, and that is, a scene that is recorded is zoomed out, and thereby a scope of recording is expanded. The longer a distance slid by the user in the first direction with two fingers is, the greater a magnification factor of the zoom ratio is; and on the contrary, the shorter the distance slid by the user in the first direction with two fingers is, the greater a reduction factor of the zoom ratio is.

Figure 7:
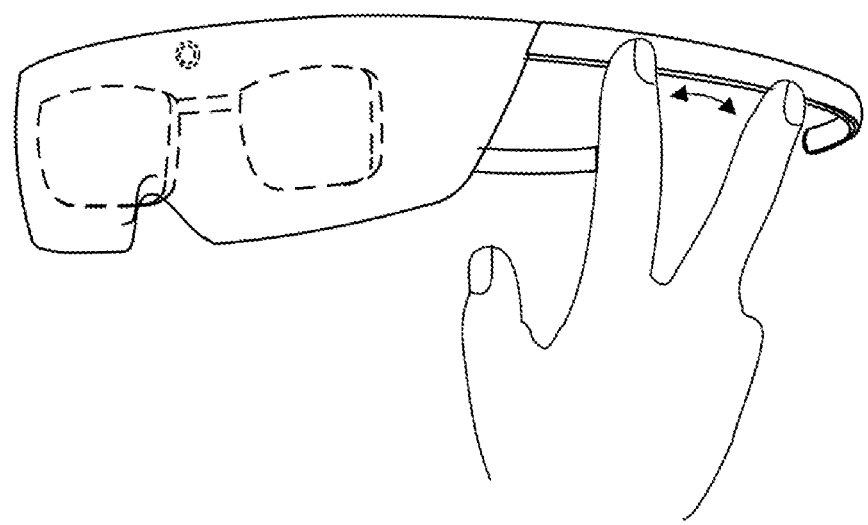
FIG. 7 is a schematic diagram showing a fourth operation of a head-wearable device according to an illustrative embodiment of the present disclosure.
Figure 8:
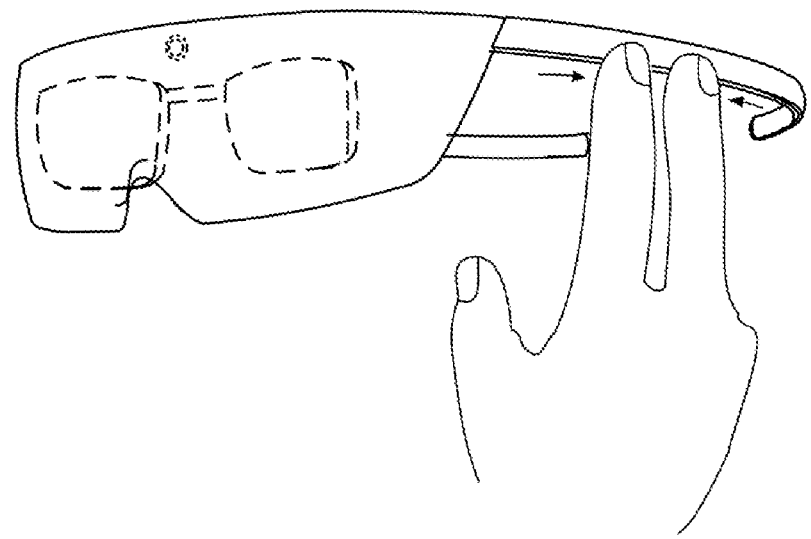
FIG. 8 is a schematic diagram showing a fifth operation of intelligent glasses according to an illustrative embodiment of the present disclosure.

In an embodiment, as shown in FIG. 7 and FIG. 8, it is assumed that the user touches the touch-control area with two fingers, in the case that the two fingers of the user slide in the touch-control area, as shown in FIG. 7, with two fingers gradually being apart, a distance between two touch points formed by the two fingers gradually increases, and the zoom ratio used during current video recording is increased at this time. As shown in FIG. 8, when the two fingers of the user slide with the two fingers gradually coming together, the distance between the two touch points formed by the two fingers gradually decreases, and the zoom ratio used during current video recording is reduced at this time. The greater an amplitude where the two fingers of the user being apart or together is, which indicates that the greater a change in the distance between the touch points is, the greater a variation factor of the zoom ratio is. The smaller the amplitude where the two fingers of the user being apart or together is, which indicates that the smaller the change in the distance between the touch points is, the smaller the variation factor of the zoom ratio is.

Step 506*a* to Step 508*a*: when the intelligent glasses switch from state 2 to state 1, determine whether a switch from state 1 to state 2 occurs within the third preset duration. For example, it is assumed that the third preset duration is 0.5 seconds, when the user touches the touch-control area with two fingers and then departs therefrom and quickly recovers touching afterwards, that is, when a switch from state 1 to state 2 occurs within the 0.5 seconds, step 516*a* is started to continue video recording at this time, and the video recording can be paused or continued when the state of the intelligent glasses is switched to state 1, that is, when the two fingers depart from the touch-control area, the video recording can be paused or continued. The video recording is paused when the two fingers depart from the touch-control area; the video recording is continued if the user recovers touching with the two fingers within 0.5 seconds; and the video recording can be paused to wait for a subsequent operation of the user if the user does not recover touching with the two fingers within 0.5 seconds. If no switch from state 1 to state 2 occurs within the 0.5 seconds, step 510*a* is started to pause the video recording and then is the step 512*a*: determine whether a switch from state 1 to state 2 occurs within the first preset duration, and when the first preset duration is reached, the step 514*a* is started to terminate the video recording. In the above steps, when the two fingers of the user no longer touch the touch-control area of the intelligent glasses, that is, a switch from state 2 to state 1 occurs and state 1 lasts for the first preset duration, and at this time, the intelligent glasses can terminate the video recording and save the generated video files.

It is worth noting that the first preset duration can be any value greater than or equal to 0.5 seconds. In the case that the first preset duration is also 0.5 seconds, when the user touches the touch-control area with two fingers and then departs therefrom and quickly recovers touching afterwards and a duration from the departure to the recovery of touching is greater than 0.5 seconds, the video recording can be directly terminated. In the case that the first preset duration is greater than 0.5 seconds, and for example, is 1 second, when the user touches the touch-control area with two fingers and then departs therefrom and quickly recovers touching afterwards and the duration from the departure to the recovery of touching does not exceed 0.5 seconds, the video recording is continued, and if the duration from the departure to the recovery of touching ranges between 0.5 seconds and 1 second, the video recording can be paused, and if the duration from the departure to the recovery of touching reaches 1 second, the video recording can be directly terminated.

Step 506*b* to step 508*b*: when the intelligent glasses switch from state 2 to state 3, determine whether a switch from state 3 to state 2 occurs within the fourth preset duration. In the process of video recording, when the intelligent glasses switch from state 2 to state 3 (that is, a part of touch points disappears) and then recover within the fourth preset duration, step 510*b* is started to perform a photographing operation and maintain the video recording. It is assumed that the fourth preset duration is 0.5 seconds, and since the intelligent glasses have switched to state 2 in the previous step, when a switch from state 2 to state 3 occurs (that is, the user switch from a two-finger touch to a single-finger touch) and the two-finger touch is recovered from the single-finger touch within 0.5 seconds, a photo of the current moment when the user recovers the two-finger touch may be taken (one photo may be captured or a plurality of photos may be captured continuously, and also the photo may be captured in a dynamic or static form). When the intelligent glasses switch from state 2 to state 3 but the two-finger touch is recovered from the single-finger touch within 0.5 seconds, the video recording can be paused at this time.

Corresponding to the above method embodiments, this specification also provides an apparatus embodiment.

Figure 9:
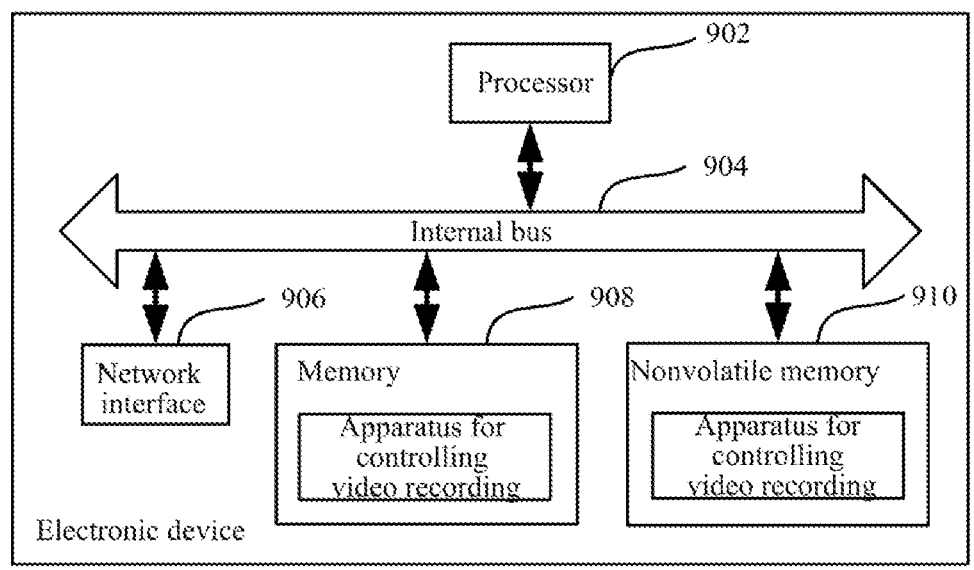
FIG. 9 is a schematic diagram showing an electronic device for controlling video recording according to an illustrative embodiment of the present disclosure.

FIG. 9 is a structural schematic diagram of an electronic device for controlling video recording according to an illustrative embodiment of the present disclosure. Referring to FIG. 9, on a hardware level, the electronic device includes a processor 902, an internal bus 904, a network interface 906, a memory 908 and a nonvolatile memory 910, and of course, other hardware required by services may also be included. The processor 902 reads a corresponding computer program from the nonvolatile memory 910 into the memory 908 and then the computer program runs, forming an apparatus for controlling video recording on a logical level. Of course, in addition to software implementation, the present disclosure does not exclude other implementations, such as a logic device or a combination of software and hardware, etc. That is to say, executive bodies of the following processing flow are not limited to respective logic units, but can also be hardware or logic devices.

Figure 10:
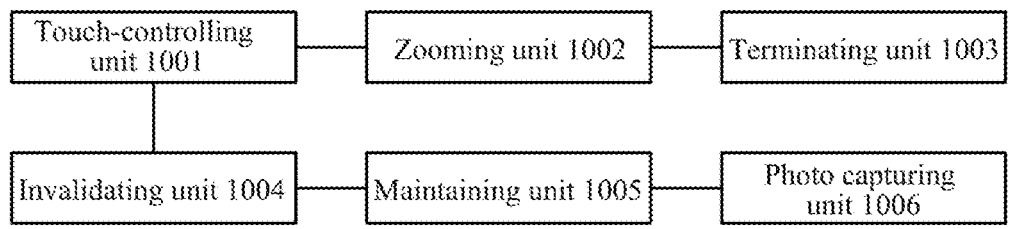
FIG. 10 is a block diagram showing an apparatus for controlling video recording according to an illustrative embodiment of the present disclosure.

FIG. 10 is a block diagram of an apparatus for controlling video recording according to an illustrative embodiment of the present disclosure. Referring to FIG. 10, the apparatus is applied to a head-wearable device which is provided with a camera and a touch-control area, and the apparatus includes:

a touch-controlling unit 1001, configured to start video recording in response to a multi-touch operation on the touch-control area;

a zooming unit 1002, configured to adjust, in a process of the video recording, a zoom ratio for the video recording according to a moving track of a touch point corresponding to the multi-touch operation; and a terminating unit 1003, configured to terminate the video recording when it is determined that a recording termination condition is met, where the recording termination condition includes that the multi-touch operation disappears and a duration of the disappearing reaches a first preset duration.

In an embodiment, adjusting, in the process of the video recording, the zoom ratio for the video recording according to the moving track of the touch point corresponding to the multi-touch operation, includes:

increasing the zoom ratio when it is detected that all touch points move towards a first direction; and reducing the zoom ratio when it is detected that all the touch points move towards a second direction;

where a variation factor of the zoom ratio is positively correlated with a distance moved by all the touch points.

In an embodiment, adjusting, in the process of the video recording, the zoom ratio for the video recording according to the moving track of the touch point corresponding to the multi-touch operation, includes:

increasing the zoom ratio when it is detected that a first change occurs to a relative distance between a part of touch points and other touch points in all touch points; and reducing the zoom ratio when it is detected that a second change occurs to a relative distance between a part of touch points and other touch points in all the touch points;

where a variation factor of the zoom ratio is positively correlated with an amount of change in the relative distance.

In an embodiment, starting the video recording includes: starting the video recording with a zoom ratio used at a moment when a previous video recording terminates; or, starting the video recording with a preset zoom ratio.

In an embodiment, the above apparatus may further include:

an invalidating unit 1004, configured to invalidate the recording termination condition when it is determined that an invalidation condition corresponding to the recording termination condition is met, where the invalidation condition includes: a duration of the multi-touch operation is no less than a second preset duration, and in the case that the recording termination condition is invalid, the video recording is continued when the multi-touch operation disappears and the duration of the disappearing reaches the first preset duration.

In an embodiment, the above apparatus may further include:

a maintaining unit 1005, configured to: in the process of the video recording, pause the video recording when the multi-touch operation disappears, and continue the video recording when the multi-touch operation recovers within a third preset duration, where the third preset duration is no greater than the first preset duration; or in the process of the video recording, maintain the video recording both during disappearance and after recovery of the multi-touch operation, where an interval from disappearance to recovery of the multi-touch operation is no greater than the third preset duration; or in the process of the video recording, continue the video recording when the multi-touch operation disappears, and pause the video recording if the multi-touch operation does not recover within the third preset duration.

In an embodiment, the above apparatus may further include:

a photo capturing unit 1006, configured to, in the process of the video recording, perform a photographing operation and maintain the video recording when a part of touch points disappears and then recovers within a fourth preset duration.

For the implementation process of the functions and roles of each unit in the above apparatus, reference is made to the implementation process of the corresponding steps in the above method for details, which will not be repeated herein.

As for the apparatus embodiment, since it basically corresponds to the method embodiment, reference is made to a part of the description of the method embodiments for the relevant details. The apparatus embodiments described above are merely illustrative, the units described as separate parts may be or may not be physically separate, a component displayed as a unit may or may not be a physical unit, that is, may be located in one place, or may be distributed to multiple network units. Part or all of the modules can be selected as required to achieve the purpose of the solution of the present disclosure, which those of ordinary skill in the art can understand and implement without creative labor.

In an illustrative embodiment, there is also provided a non-transitory computer-readable storage medium including instructions, such as a memory including instructions, where the instructions can be executed by the processor of the apparatus for controlling video recording, so as to implement the method according to any of the above embodiments, for example, the method may include:

starting video recording in response to a multi-touch operation on the touch-control area; adjusting, in a process of the video recording, a zoom ratio for the video recording according to a moving track of a touch point corresponding to the multi-touch operation; and terminating the video recording when it is determined that a recording termination condition is met, where the recording termination condition includes that the multi-touch operation disappears and a duration of the disappearing reaches a first preset duration.

The non-transitory computer-readable storage medium can be a read only memory (ROM), a random access memory (RAM), a CD-ROM, a magnetic tape, a floppy disk, an optical data storage device, etc., which is not limited in the present disclosure. The above are only preferred embodiments of the present disclosure, and are not intended to limit the present disclosure. Any modification, equivalent replacement, improvement, etc. made within the spirit and the principle of the present disclosure shall be included in the scope of protection of the present disclosure.

What is claimed is:

1. A method for controlling video recording, wherein the method is applied to a head-wearable device which is provided with a camera and a touch-control area, and the method comprises:

starting video recording in response to a multi-touch operation on the touch-control area, wherein one touch point is formed where each finger touches the touch-control area, a user can complete the multi-touch operation with no more than two fingers;

adjusting, in a process of the video recording, a zoom ratio for the video recording according to a moving track of a touch point corresponding to the multi-touch operation; and terminating the video recording when it is determined that a recording termination condition is met, wherein the recording termination condition comprises that the multi-touch operation disappears and a duration of the disappearing reaches a first preset duration;

wherein the method further comprises:

performing a photographing operation and maintaining the video recording, in the process of the video recording, when a part of touch points disappears and then recovers within a fourth preset time.

2. The method according to claim 1, wherein the adjusting, in a process of the video recording, a zoom ratio for the video recording according to a moving track of a touch point corresponding to the multi-touch operation comprises:

increasing the zoom ratio when it is detected that all touch points move towards a first direction; and reducing the zoom ratio when it is detected that all the touch points move towards a second direction;

wherein a variation factor of the zoom ratio is positively correlated with a distance moved by all the touch points.

3. The method according to claim 1, wherein the adjusting, in a process of the video recording, a zoom ratio for the video recording according to a moving track of a touch point corresponding to the multi-touch operation comprises:

increasing the zoom ratio when it is detected that a first change occurs to a relative distance between a part of touch points and other touch points in all touch points; and reducing the zoom ratio when it is detected that a second change occurs to the relative distance between the part of touch points and the other touch points in all the touch points;

wherein a variation factor of the zoom ratio is positively correlated with an amount of change in the relative distance.

4. The method according to claim 1, wherein the starting video recording comprises:

starting the video recording with a zoom ratio used at a moment when a previous video recording terminates; or starting the video recording with a preset zoom ratio.

5. The method according to claim 1, further comprising: invalidating the recording termination condition when it is determined that an invalidation condition corresponding to the recording termination condition is met, wherein the invalidation condition comprises: a duration of the multi-touch operation is no less than a second preset duration; and continuing, when the recording termination condition is invalid, the video recording when the multi-touch operation disappears and the duration of the disappearing reaches the first preset duration.

6. The method according to claim 1, further comprising: pausing, in the process of the video recording, the video recording when the multi-touch operation disappears, and continuing the video recording when the multi-touch operation recovers within a third preset duration, wherein the third preset duration is no greater than the first preset duration; or maintaining, in the process of the video recording, the video recording both in a process of disappearance and after recovery of the multi-touch operation, wherein an interval from the disappearance to the recovery of the multi-touch operation is no greater than the third preset duration; or continuing, in the process of the video recording, the video recording after the multi-touch operation disappears, and pausing the video recording if the multi-touch operation does not recover within the third preset time.

7. A non-transitory computer-readable storage medium, having computer instructions stored thereon, wherein the computer instructions, when executed by a processor, cause the method according to claim 1 to be implemented.

8. An apparatus for controlling video recording, wherein the apparatus is applied to a head-wearable device which is provided with a camera and a touch-control area, and the apparatus comprises: a processor and a memory for storing processor-executable instructions which, when executed by the processor, cause the processor to:

start video recording in response to a multi-touch operation on the touch-control area, wherein one touch point is formed where each finger touches the touch-control area, a user can complete the multi-touch operation with no more than two fingers;

adjust, in a process of the video recording, a zoom ratio for the video recording according to a moving track of a touch point corresponding to the multi-touch operation; and terminate the video recording if it is determined that a recording termination condition is met, wherein the recording termination condition comprises that the multi-touch operation disappears and a duration of the disappearing reaches a first preset duration;

wherein the processor-executable instructions further cause the processor to:

perform a photographing operation and maintain the video recording, in the process of the video recording, when a part of touch points disappears and then recovers within a fourth preset time.

9. The apparatus according to claim 8, wherein the processor-executable instructions further cause the processor to:

increase the zoom ratio when it is detected that all touch points move towards a first direction; and reduce the zoom ratio when it is detected that all the touch points move towards a second direction;

wherein a variation factor of the zoom ratio is positively correlated with a distance moved by all the touch points.

10. The apparatus according to claim 8, wherein the processor-executable instructions further cause the processor to:

start the video recording with a zoom ratio used at a moment when a previous video recording terminates; or start the video recording with a preset zoom ratio.

11. The apparatus according to claim 8, wherein the processor-executable instructions further cause the processor to:

invalidate the recording termination condition when it is determined that an invalidation condition corresponding to the recording termination condition is met, wherein the invalidation condition comprises: a duration of the multi-touch operation is no less than a second preset duration; and continue, when the recording termination condition is invalid, the video recording when the multi-touch operation disappears and the duration of the disappearing reaches the first preset duration.

12. The apparatus according to claim 8, wherein the processor-executable instructions further cause the processor to:

pause, in the process of the video recording, the video recording when the multi-touch operation disappears, and continue the video recording when the multi-touch operation recovers within a third preset duration, wherein the third preset duration is no greater than the first preset duration; or maintain, in the process of the video recording, the video recording both in a process of disappearance and after recovery of the multi-touch operation, wherein an interval from the disappearance to the recovery of the multi-touch operation is no greater than the third preset duration; or continue, in the process of the video recording, the video recording after the multi-touch operation disappears, and pause the video recording if the multi-touch operation does not recover within the third preset time.

* * * * *